US007656788B2

(12) United States Patent
Ma et al.

(10) Patent No.: US 7,656,788 B2
(45) Date of Patent: Feb. 2, 2010

(54) HIGH-RELIABILITY CLUSTER MANAGEMENT

(75) Inventors: Lucern K. Ma, San Jose, CA (US); Murali Duvvury, San Jose, CA (US)

(73) Assignee: Cisco Technology, Inc., San Jose, CA (US)

( * ) Notice: Subject to any disclaimer, the term of this patent is extended or adjusted under 35 U.S.C. 154(b) by 592 days.

(21) Appl. No.: 11/058,688

(22) Filed: Feb. 14, 2005

(65) Prior Publication Data

US 2005/0141499 A1 Jun. 30, 2005

Related U.S. Application Data

(63) Continuation of application No. 09/738,409, filed on Dec. 15, 2000, now Pat. No. 6,856,591.

(51) Int. Cl.
*H04J 3/14* (2006.01)
(52) U.S. Cl. ........................ 370/219; 370/217
(58) Field of Classification Search ................ 370/216, 370/219, 217; 709/245, 243; 714/4
See application file for complete search history.

(56) References Cited

U.S. PATENT DOCUMENTS

| | | | |
|---|---|---|---|
| 4,644,532 A | 2/1987 | George et al. | 370/94 |
| 4,922,486 A | 5/1990 | Lidinsky et al. | 370/60 |
| 4,933,937 A | 6/1990 | Konishi | 370/85.13 |
| 4,962,497 A | 10/1990 | Ferenc et al. | 370/60.1 |
| 5,095,480 A | 3/1992 | Fenner | 370/94.1 |
| 5,136,580 A | 8/1992 | Videlock et al. | 370/60 |
| 5,241,682 A | 8/1993 | Bryant et al. | 395/800 |
| 5,274,631 A | 12/1993 | Bhardwaj | 370/60 |
| 5,280,480 A | 1/1994 | Pitt et al. | 370/85.13 |
| 5,287,103 A | 2/1994 | Kasprzyk et al. | 340/825.52 |
| 5,319,644 A | 6/1994 | Liang | 370/85.5 |
| 5,371,852 A | 12/1994 | Attanasio et al. | 395/200 |
| 5,394,402 A | 2/1995 | Ross | 370/94.1 |
| 5,430,715 A | 7/1995 | Corbalis et al. | 370/54 |

(Continued)

OTHER PUBLICATIONS

Cisco Systems, Inc., "DHCP Solution Helps Scale and Configure IP Nodes in Growing Switched Networks", printed from http://cio.cisco.co.jp/warp/public/795/6.html, on Sep. 10, 1998, 2 pages.

(Continued)

*Primary Examiner*—Ricky Ngo
*Assistant Examiner*—Chandrahas Patel
(74) *Attorney, Agent, or Firm*—BainwoodHuang

(57) ABSTRACT

A method for managing a cluster of network devices, the cluster includes a command network device and at least one member network device, and the command network device has a commander IP address and a commander MAC address, includes: defining a standby group by assigning a virtual IP address and a virtual MAC address; selecting a first network device, which is the command device, for the standby group; selecting at least one second network device, which has an IP address, for the standby group; defining a standby priority for each network device in the standby group; and binding the standby group to the cluster, by replacing the commander IP address with the virtual IP address and replacing the commander MAC address with the virtual MAC address. Upon the binding, the network device with a highest priority becomes an active commander, and the network device with a second highest priority becomes a standby commander.

12 Claims, 6 Drawing Sheets

U.S. PATENT DOCUMENTS

| | | | |
|---|---|---|---|
| 5,473,599 A * | 12/1995 | Li et al. | 370/219 |
| 5,530,963 A | 6/1996 | Moore et al. | 395/200.15 |
| 5,594,732 A | 1/1997 | Bell et al. | 370/402 |
| 5,617,421 A | 4/1997 | Chin et al. | 370/402 |
| 5,715,394 A | 2/1998 | Jabs | 395/200.11 |
| 5,793,763 A | 8/1998 | Mayes et al. | 370/389 |
| 5,802,047 A | 9/1998 | Kinoshita | 370/359 |
| 5,812,529 A | 9/1998 | Czarnik et al. | 370/245 |
| 5,835,720 A | 11/1998 | Nelson et al. | 395/200.54 |
| 5,835,725 A | 11/1998 | Chiang et al. | 395/200.58 |
| 5,854,901 A | 12/1998 | Cole et al. | 395/200.75 |
| 5,918,016 A | 6/1999 | Brewer et al. | 395/200.5 |
| 5,923,854 A * | 7/1999 | Bell et al. | 709/243 |
| 5,968,116 A | 10/1999 | Day, II et al. | 709/202 |
| 6,023,724 A | 2/2000 | Bhatia et al. | 709/218 |
| 6,055,236 A | 4/2000 | Nessett et al. | 370/389 |
| 6,119,160 A | 9/2000 | Zhang et al. | 709/224 |
| 6,195,705 B1 * | 2/2001 | Leung | 709/245 |
| 6,636,499 B1 | 10/2003 | Dowling | |
| 6,725,264 B1 | 4/2004 | Christy | |
| 6,856,591 B1 * | 2/2005 | Ma et al. | 370/216 |
| 7,061,858 B1 * | 6/2006 | Di Benedetto et al. | 370/219 |
| 7,239,618 B1 * | 7/2007 | La Porta et al. | 370/331 |

OTHER PUBLICATIONS

"Hot Products & Solutions—IP Address Management: A White Paper", Network Registrar, American Internet Corporation, Bedford, MA, printed from http://www.american.com/ip-mgmt.html, on Jul. 24, 1998.

NAT and Networks, printed from http://www.csn.tu-chemnitz.de/~mha/linux-ipnat/diplom/node4.html,on Sep. 19, 1998.

"NAT-PC Webopaedia Definition and Links", 1998, Mecklermedia Corporation, printed from http://webopedia.internet.com/TERM/N/NAT.html, on Sep. 19, 1998, 1 page.

"Network Address Translation Information", printed from http://www.uq.edu.au/~gadmacka/content/natinformation.htm, on Sep. 19, 1998.

"Regain Confidence and Control Over Your IP Address Infrastructure", Network Registrar, American Internet Corporation, Bedford, MA.

"Three Ways to Manage IP Addresses", PC Magazine: IP Address Management, printed from http://www.zdnet.com/pcmag/features/ipmanage/ip-s2.htm, on Sep. 10, 1998.

* cited by examiner

HIGH-RELIABILITY CLUSTER MANAGEMENT

This application is a continuation of U.S. patent application Ser. No. 09/738,409 (Now U.S. Pat. No. 6,856,591, issued on Feb. 15, 2005), entitled "Method and Apparatus for High Reliability Cluster Management," filed on Dec. 15, 2000, in the names of the same inventors and commonly assigned herewith.

BACKGROUND OF THE INVENTION

1. Field of the Invention

The present invention relates to the field of data communications networks. More specifically, the present invention relates to a method and system for providing high reliability to management of a cluster of network devices, and a method and system for managing a cluster of network devices.

2. The Background Art

Data communications networks known to those skilled in the art include Local Area Networks (LANs), Metropolitan Area Networks (MANs), and Wide Area Networks (WANs). Network devices are used to transmit information across networks, which may include various combinations of LANs, MANs, and WANs. Such network devices may include switches, bridges and routers.

Network management includes configuring network devices, monitoring the active network in order to diagnose problems, and gather statistics and information for administration. The Simple Network Management Protocol (SNMP) is one currently popular example of a network management tool and almost all network management software supports the SNMP. The SNMP is a simple request/response protocol that communicates management information between two types of SNMP entities: SNMP applications (also called SNMP managers) and SNMP agents. The SNMP applications are typically executed in a network management station, and the SNMP agents reside in external network devices (or "network elements"). The SNMP applications issue queries to gather information about the status, configuration, and performance of the network elements. The SNMP agents, which are hardware and/or software processes, report activity in each network element to the workstation console used to oversee the network. The agents return information contained in a management information base (MIB). A MIB is a data structure that defines what is obtainable from the network element and what can be controlled (turned off, on, etc.). The CiscoWorks™ software package, available from Cisco Systems, Inc. of San Jose, Calif., is an example of network management product supporting SNMP, and a LAN switch is an example of a network element that can be managed using SNMP.

A LAN switch is a network device that cross connects stations or LAN segments. A LAN switch is a Layer 2 switch that operates at Layer 2 (or Data Link Layer) of the OSI Reference Model, and forwards data traffic based on Media Access Control (MAC) layer addresses. LAN switches are available for Ethernet, Fast Ethernet, Token Ring, Fiber Distributed Data Interface (FDDI), and other similar LANs.

An Ethernet LAN switch improves bandwidth by separating collision domains and selectively forwarding traffic to the appropriate LAN segments. FIG. 1A illustrates a typical LAN switch 2 for a switched LAN. The LAN switch 2 contains a high-speed backplane and room for typically 4-32 plug-in line cards, for example, cards 3a-3d. Each card contains one to eight ports (connectors), for example, ports 4a-4p. Most often, each port is connected to a single host computer.

When a host 5a need to transmit data, it outputs a standard frame to the LAN switch 2. The card 3a getting the frame checks to see if the frame is destined for one of the other host connected to the same card 3a. If so, the frame is copied there and sent to the appropriate host on the same card, for example, the host 5b. If not, the frame is sent over the high-speed backplane to the destination's card, for example, to the card 3c. The card 3c sends the frame to the destination host, for example, the host 5k. In this kind of plug-in card, typically, only one transmission per card is possible at any instant. However, all the cards can be transmitting in parallel. With this design, each card forms its own collision domain, independent of the others.

Performance improves in LANs in which switches are installed because the LAN switches create isolated collision domains. Thus, by spreading users over several collision domains, collisions are reduced and performance improves. In addition, one or more ports of the LAN switch 2 (for example, a port 4p) may be used to connect another LAN switch 6 or LAN segment, rather than a single host.

As LAN grows, either due to additional users or network devices, additional switches must often be added to the LAN and connected together to provide more ports and new network segments. FIG. 1B schematically illustrates two LAN switches 2 connected in a cascaded configuration. On each of the LAN switches, four ports 4a-4d are dedicated to interswitch communication. The other ports on each LAN switch 2 are connected to hosts. For example, if each of the four interswitch connection is capable of supporting a 100 Mbps Fast Ethernet channel, the aggregate interswitch communication rate of the switches is 400 Mbps. However, the total number of ports available for connecting to hosts or other network devices on each LAN switch is diminished due to the dedicated interswitch connections that are necessary to implement the cascaded configuration.

As a computer network grows, network devices or switches are typically added to the network and interconnected according to the needs of the particular network to which they belong. Installing a network device traditionally includes inserting the device into the network and assigning it an Internet Protocol (IP) address. The IP address is a unique address that specifies the logical location of a host or client (i.e., the network device) on the Internet. In general, each network device must have its own IP address to be configured and managed, and each IP address must be registered with a domain name service (DNS). Once a network device has been assigned an IP address, a network administrator can access the network device by entering its IP address from a network management station. The network device can be configured from anywhere in the Internet using a protocol such as the SNMP.

However, assigning an IP address to each and every network device is undesirable, because registering IP addresses with a DNS is both costly and cumbersome, and the number of available IP addresses is limited. Furthermore, configuring each one of the network devices in a network requires considerable time and labor of a network administrator.

Clustering technology alleviates these problems by enabling a network administrator to configure and manage a group of switches using a single IP address. Such a group of switches is called as a cluster and is regarded as a single network entity. A cluster includes one commander switch and one or more member switches. A single IP address is assigned to the commander switch, and all of the switches in the cluster are then configured and managed though the commander switch using this single IP address.

FIGS. 2A-2C schematically illustrate examples of a cluster of switches, which includes one commander switch 7 and the member switches 9a-9h. FIG. 2A illustrates a cluster 11 in a star configuration, where all the member switches 9a-9h are directly connected to the commander switch 7. FIG. 2B illustrates a cluster 13 in a daisy-chain configuration, where only one the member switch 9a is directly connected to the commander device 7, and other the member switches 9b-9g are each connected to an "upstream" switch (fewer "hops" away from the commander switch 7). FIG. 2C illustrates a cluster 15 in a hybrid (or tree) configuration, in which star configuration and daisy chain configuration are combined. As shown in FIG. 2C, member switches 9a and 9e are directly connected to the commander switch 7, and other member switches are connected to either one of the member switches 9a and 9b via either star (parallel) or daisy chain (serial) configuration.

Typically, each switch in the cluster is capable of supporting a network management protocol, such as the SNMP discussed above, and contains its own management information base (MIB). Each switch in the cluster may be identified by a MAC address and/or unique identifier such as a unique community string in a SNMP implementation. However, only the commander switch is required to have an IP address. In a SNMP implementation, the cluster is configured and managed using the single IP address, a single password, and a single set of SNMP strings. The commander switch is the single point of contact for entire cluster, and all management requests are first sent to the commander switch and then forwarded to member switches.

The member switches of a cluster can be in the same location, or they can be distributed across a contiguous Layer 2 network. That is, a management network to which the cluster belongs may be a virtual LAN (VLAN). A VLAN is a switched network that is logically segmented by function, project team, or application, without regard to the physical locations of the user stations or physical LAN segment. Any switch port can belong to a VLAN. Since a VLAN is considered as a separate logical network, packets destined for stations that do not belong to the VLAN are forwarded through a router or bridge, but not through a LAN switch. Thus, in general, the commander switch and all member switches of the cluster must belong to the same management VLAN.

Although the clustering technology realizes efficient management of network switches, a single point of contact can be a single point of failure. The commander switch's failure may cause the entire cluster to break. It would be desirable to provide commander switch redundancy (a standby group) to the cluster. That is, if the commander switch (active commander) fails, another network switch (standby commander) should be able to take over and become the current active commander for the cluster. It would also be desirable to provide a self-recovery mechanism for the cluster information in the case where the active commander and the standby commander fail at the same time.

BRIEF DESCRIPTION OF THE INVENTION

According to one aspect of the present invention, a method provides high reliability to management of a cluster of network devices. The cluster includes a command network device and at least one member network device. The command network device has a commander IP address and a commander MAC address. The method includes defining a standby group for the cluster by assigning a virtual IP address and a virtual MAC address to the standby group; selecting a first network device for the standby group, the first network device being the command network device; selecting at least one second network device for the standby group, the second network device having an IP address and belonging to the management virtual network; defining a standby priority for each network device in the standby group; and binding the standby group to the cluster, by replacing the commander IP address with the virtual IP address and replacing the commander MAC address with the virtual MAC address.

Upon the binding, the network device with a highest priority in the standby group becomes an active commander; the network device with a second highest priority in the standby group becomes a standby commander; and the network device with a third highest priority, if any, becomes a passive commander. The cluster is controlled through the active commander using the virtual IP address, and the active commander periodically forwards cluster configuration information to the standby commander. When the active commander fails, the standby commander takes over the role of the active commander. That is, the control of the cluster is switched from the active commander to the standby commander, and the standby commander becomes a current active commander.

If both the active commander and the standby commander fail at the same time, the passive commander takes the role of the active commander and becomes a current active commander. In this case, the member network devices of the cluster forward their own member information to the current active commander, so that the current active commander can reconstruct the cluster configuration information.

According to another aspect of the present invention, an apparatus for providing high reliability to the cluster management includes a port, a memory, a state machine, an event determiner, a state controller, a commander activator, and a database module.

The port is allocated to belong to a management virtual network, and capable of communicating with network devices of the cluster, and capable of exchanging data packets and messages with network devices of the standby group. The memory includes a location allocated to store an IP address and a MAC address assigned to the apparatus, a location allocated to store a virtual IP address and a virtual MAC address, the virtual IP address and the virtual MAC address assigned to and defining a standby group provided for the cluster, and a location allocated to store a standby priority assigned to the apparatus. The state machine has an active state and a standby state. The state machine may also include a passive state and other states. The messages include hello messages. Each hello message has state and priority information. The event determiner determines an event based on receipt of the hello messages and the state and priority information of received hello messages. The state controller changes the state of the state machine in response to a specific event determined by the event determiner. The commander activator is responsive to state transition of the state machine, and replaces the IP address assigned to the apparatus with the virtual IP address to be used as a source IP address of the apparatus, and replaces the MAC address assigned to the apparatus with the virtual MAC address to be used as a source MAC address of the apparatus. The database module is capable of maintaining and transmitting cluster configuration information of the cluster when the state machine is in the active state, and capable of receiving and storing cluster configuration information when the state machine is in the standby state.

BRIEF DESCRIPTION OF THE DRAWINGS

The accompanying drawings, which are incorporated into and constitute a part of this specification illustrate one or more embodiments of the invention and, together with the present description, serve to explain the principles and implementations of the invention.

DETAILED DESCRIPTION OF A PREFERRED EMBODIMENT

Embodiments of the present invention are described herein in the context of a method and system for high reliability cluster management. Those of ordinary skill in the art will recognize that the following description of the present invention is illustrative only and not intended to be in any way limiting. Other embodiments of the invention will readily suggest themselves to such skilled person having the benefit of this disclosure. Reference will now be made in detail to implementations of the present invention as illustrated in the accompanying drawings. The same reference numbers will be used throughout the drawings and the following description to refer to the same or like parts.

In the interest of clarity, not all of the routine features of the implementations described herein are described. It will of course be appreciated that in the development of any such actual implementation, numerous implementation-specific decisions must be made to achieve the developer's specific goals, such as compliance with system- and business-related goals, and that these goals will vary from one implementation to another. Moreover, it will be appreciated that such a development effort might be complex and time-consuming, but would nevertheless be a routine undertaking of engineering for those of ordinary skill in the art having the benefit of this disclosure.

In accordance with the present invention, the components, process steps, and/or data structures may be implemented using various types of operating systems, computing platforms, computer programs, and/or general purpose machines. In addition, those of ordinary skill in the art will readily recognize that devices of a less general purpose nature, such as hardwired devices, field programmable gate access (FPGA), application specific integrated circuits (ASIC), or the like, may also be used without departing form the scope and sprit of the inventive concepts disclosed herein.

A method and system for providing high reliability to management of a cluster of network devices according to a presently preferred embodiment of the present invention is described below. The following description, the method and system of the present invention may be implemented in a product, device, or collection of devices and software products. For example, the present invention may be implemented in and performed by Cisco Catalyst®3500 series XL, 2900 series XL, and 1900 series switches, available from Cisco Systems, Inc. of San Jose, Calif.

Figure 1A:
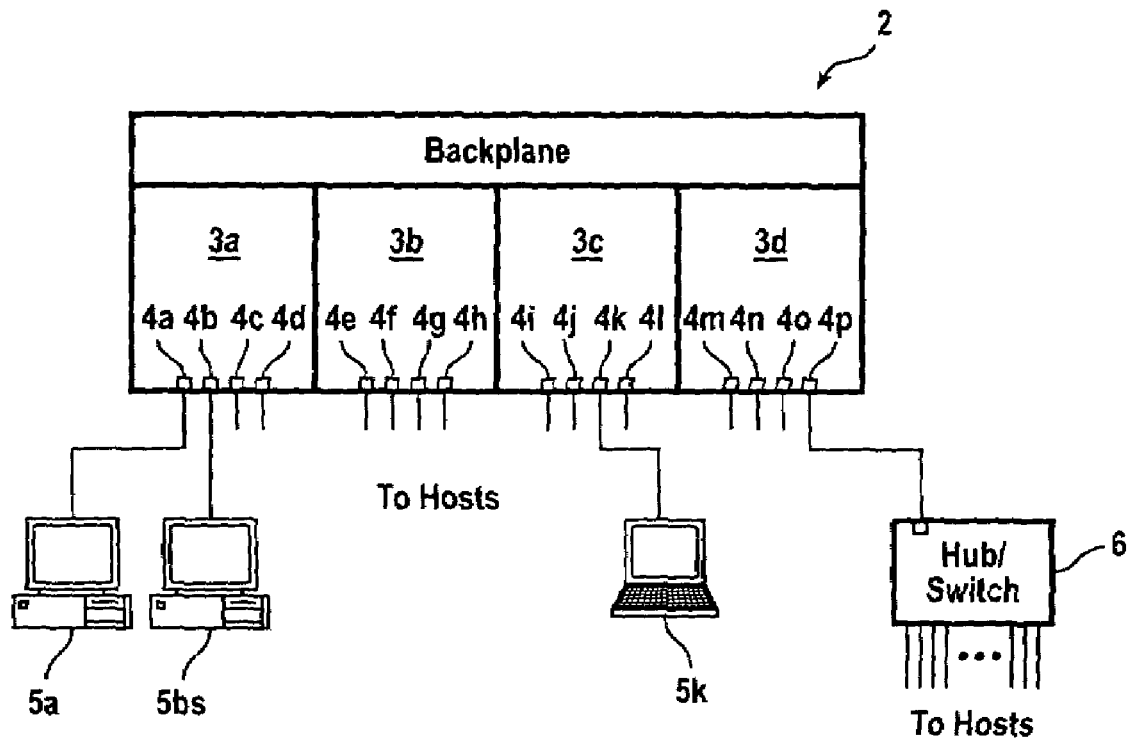
FIG. 1A is a diagram schematically illustrating a typical LAN switch.
Figure 1B:
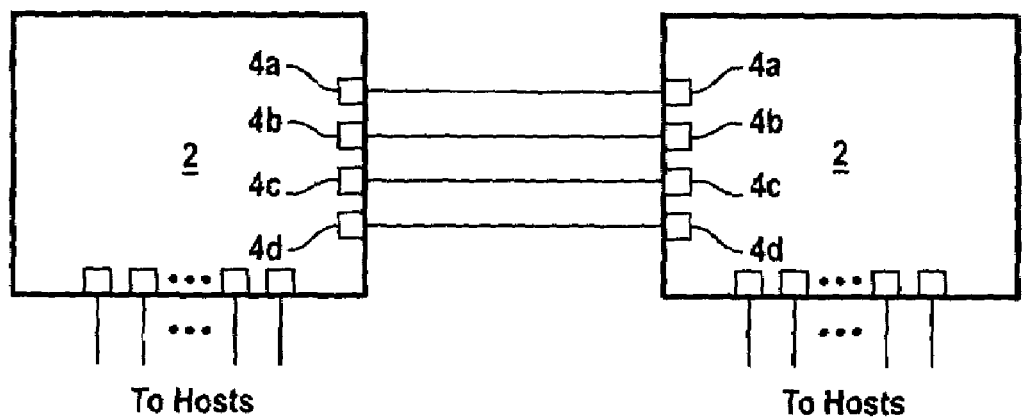
FIG. 1B is a diagram schematically illustrating two LAN switches connected in a cascaded configuration.
Figure 2A:
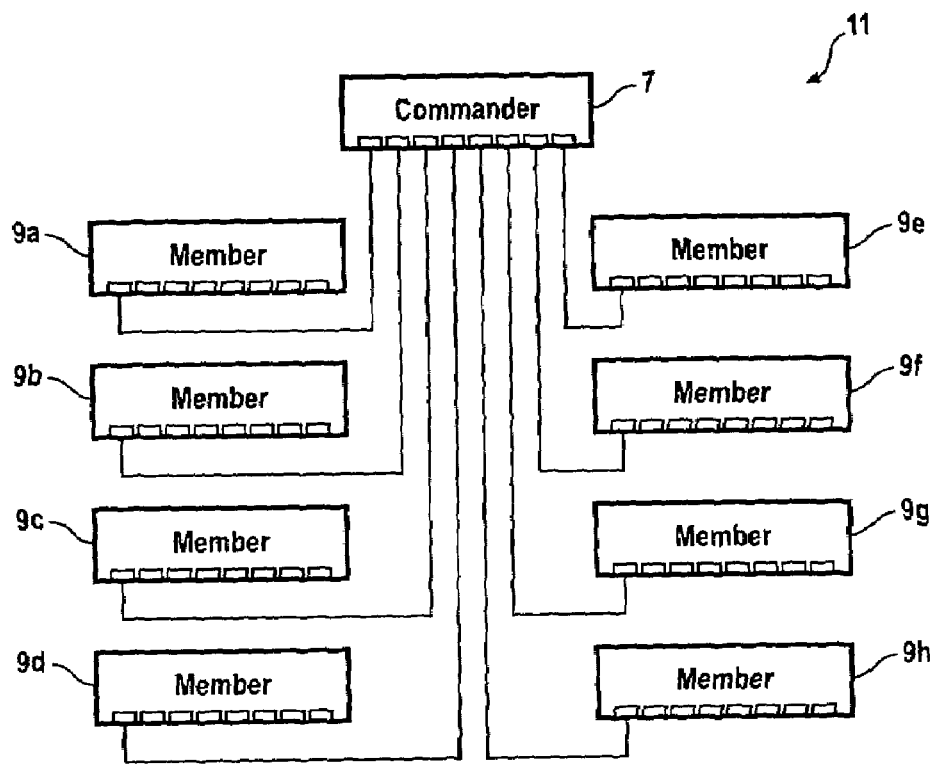
FIG. 2A is a diagram schematically illustrating a cluster of network switches in a star configuration.
Figure 2B:
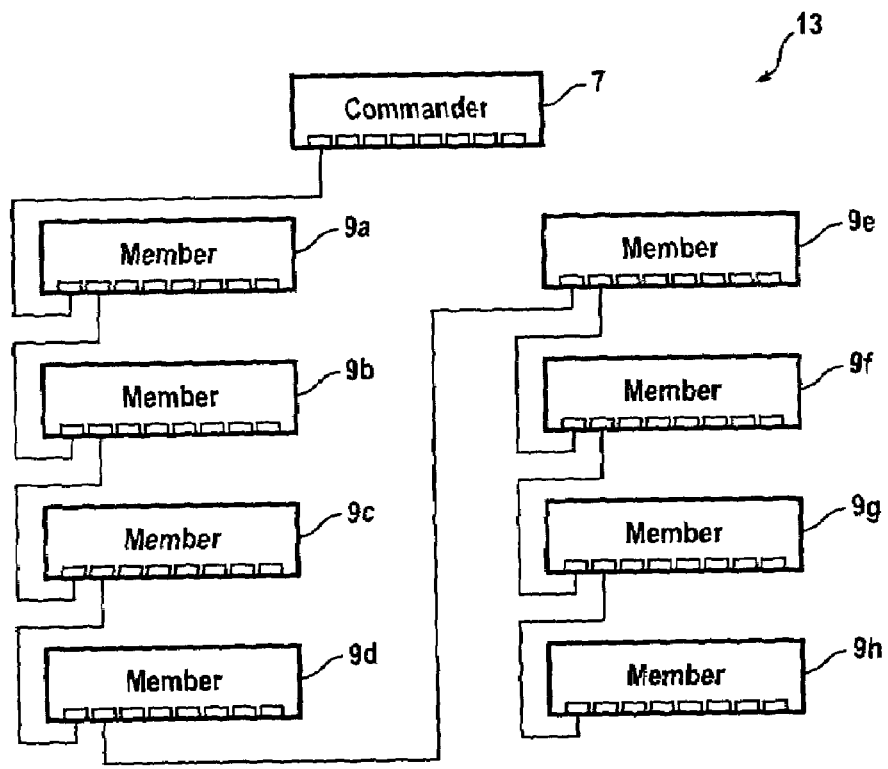
FIG. 2B is a diagram schematically illustrating a cluster of network switches in a daisy-chain configuration.
Figure 2C:
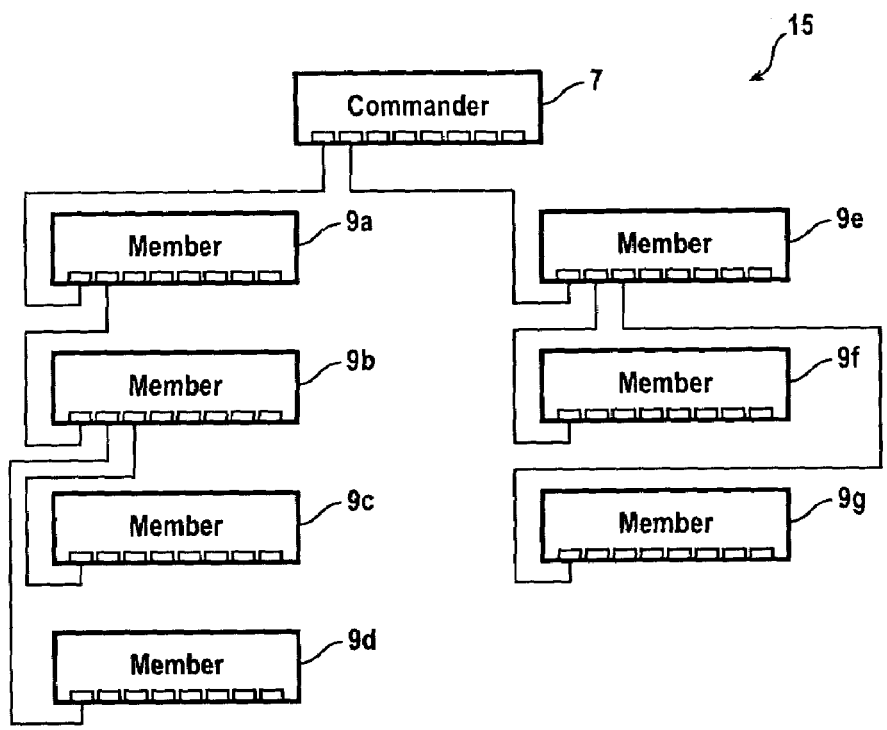
FIG. 2C is a diagram schematically illustrating a cluster of network switches in a hybrid configuration.
Figure 3:
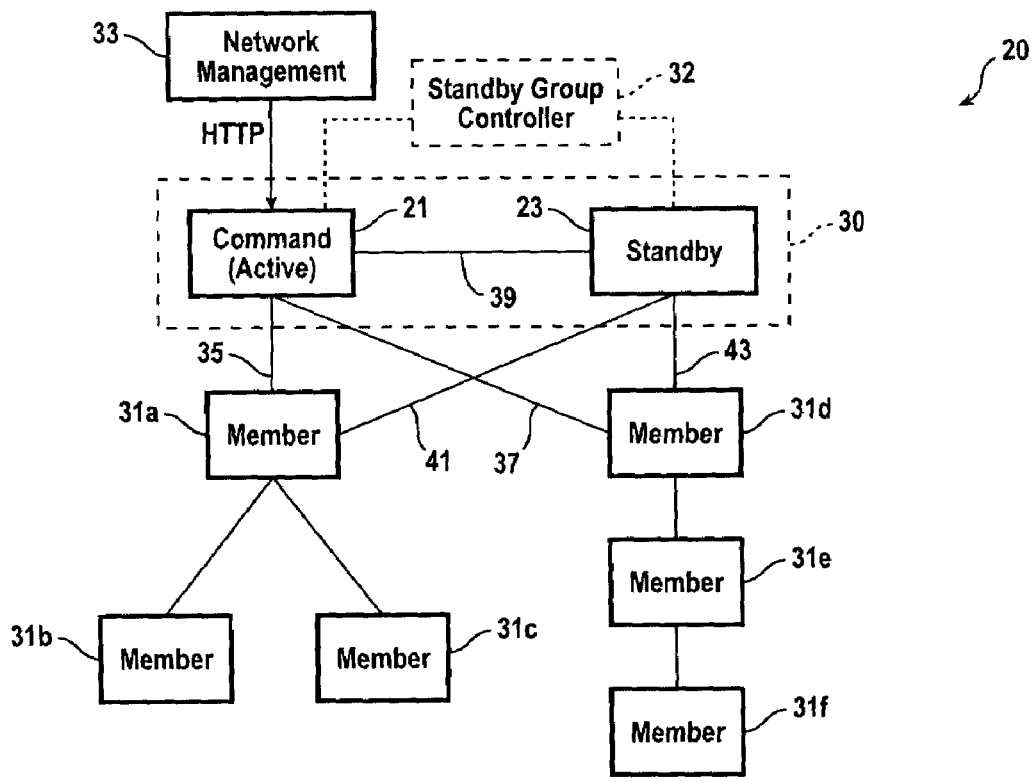
FIG. 3 is a diagram schematically illustrating a cluster of network devices according to a presently preferred embodiment of the present invention.

FIG. 3 schematically illustrates a cluster 20 of network devices according to a presently preferred embodiment of the present invention. The network devices are layer 2 switches, which may be in the same location or distributed across a contiguous Layer 2 network. The network devices may be LAN switches. A port of each network device belongs to a management network, or a management virtual LAN (VLAN).

The cluster 20 includes a command network device 21 and at least one member network device(s) 31a-31f. A standby group 30 is defined by assigning a virtual IP address and a virtual MAC address thereto. According to this embodiment, the standby group 30 includes the command network device 21 and a second network device 23. The second network device 23 is preferably a member of the cluster 20. However, the second network device 23 is not necessarily a member of the cluster 20. The standby group 30 is defined independent of the cluster 20, and may include any number of eligible network devices regardless of their membership of the cluster 20. A network management station 33 for managing the cluster 20 is coupled with the cluster 20 and the standby group 30.

Each network device in the standby group 30 has its own IP address and a standby priority. The IP address is typically assigned to the network device when it is configured, or may be assigned when it is added to the standby group 30. The standby priority is typically set for the network device when it is added to the standby group 30. When the standby group is activated, or "bound" to the cluster 20, as described below, the network device having the highest priority (for example, the command network device 21) becomes an active commander, and the network device having the second highest priority (for example, the network device 23) becomes a standby commander. Although is typical that the highest standby priority is set for the command network device 21 of the cluster 20, the highest standby priority may be set for the second network device 23. In such a case, the second network device 23 will become the active commander and the network device 21 will become the standby commander upon binding.

The virtual IP address and the virtual MAC address assigned to the standby group 30 belong to the active commander, i.e., the command network device 21 with the highest priority. The cluster 20 is managed through the active commander using the virtual IP address. In one preferred embodiment of the present invention, a cluster with up to 16 network devices (including the command network device) may be configured and managed though the single virtual IP address.

The active commander "owns" the virtual IP address and the virtual MAC address. That is, the active commander uses the virtual IP address as its source IP address and the virtual MAC address as its source MAC address, instead of its own IP address and MAC address. Accordingly, when the standby group is bound on the cluster, the active commander receives cluster member traffic and cluster management information destined for the virtual IP address, and receives all data packets and frames destined for the virtual MAC address.

All configuration requests and network management messages from the network management station 33 are destined for the virtual IP address, i.e., directed to the active commander. The active commander performs any required authentication. The commander translates and redirects the network management messages to member network devices, if necessary, so that the messages are processed by the appropriate member network device. Responses to network management messages from the member device are received by the active commander and redirected to the network management station 33.

If the active commander 21 fails, the standby commander, i.e., the network device 23 having the next highest priority, takes over the commander role. That is, the control of the cluster 20 is switched from the active commander to the standby commander. The second/standby network device 23 becomes a current active commander, and the "ownership" of the virtual IP address and the virtual MAC address is transferred to the network device 23. Such switching of the cluster control may be performed by a standby group controller 32, which may be implemented as a software and/or hardware in each network device of the standby group 30.

As shown in FIG. 3, the member network devices 31a-31f are coupled with the command network device 21 directly or indirectly through one or more member network devices. The cluster 20 has a hybrid configuration: the command network device 21 is directly connected to the member network devices 31a and 31d; the member network devices 31b and 31c are connected to the member network device 31a; and the member network device 31f is connected through the member network device 31e to the member device 31d. The standby network device 23 is also connected to the commander network device 21 and the member network devices 31a and 31d, with which other member network devices are connected.

It should be noted that both the command network device 21 and the standby network device 23 are connected to the member network devices 31a and 31d, providing redundant connectivity. That is, even though the command network device 21 fails and connections 35 and 37 become down, the standby network device 23 can reach all member network devices 31a-31g directly or indirectly through connections 41 and 43.

All of the network devices 21, 23, and 31a-31f in the cluster 20 and/or the standby group 30 belong to a management virtual network, for example, a management. VLAN. The cluster 20 may be managed from a network management station through ASCII terminal consoles, Telnet sessions, SNMP management stations and Web consoles. The management may be "in-band," either by connecting via Telnet to the command network device 21 and using a management consol, or by communicating with an in-band management interface of the command network device 21 using the SNMP. This can be accomplished by using an SNMP-compatible network management application and the network device's Management Information Base (MIB) files.

A presently preferred embodiments of the present invention supports the following configuration and management interfaces: Hyper Text Markup Language (HTML) interfaces (web-based), SNMP, and a proprietary Internet Operating System (IOS) command line interpreter (CLI). Each of these management interfaces can be used to monitor and configure network devices in the cluster 20. For example, a network management'software such as the Cluster Manager™ program or Cluster Management Suite, available from Cisco Systems, Inc. of San Jose, Calif., may be used. The cluster management tools are web-based, and may be accessed via an ordinary web browser, such as Netscape Navigator™ or Microsoft Internet Explorer™.

Web-based management uses the Hypertext Transfer Protocol (HTTP). HTTP is an in-band communication via one of the Ethernet ports that are used to receive and transmit normal data in each network device. HTTP communication usually takes place over Transmission Control Protocol/Internet Protocol (TCP/IP) connections. However, HTTP may be implemented on top of any other protocol on the Internet or other networks so long as the protocol provides a reliable transport.

Figure 4:
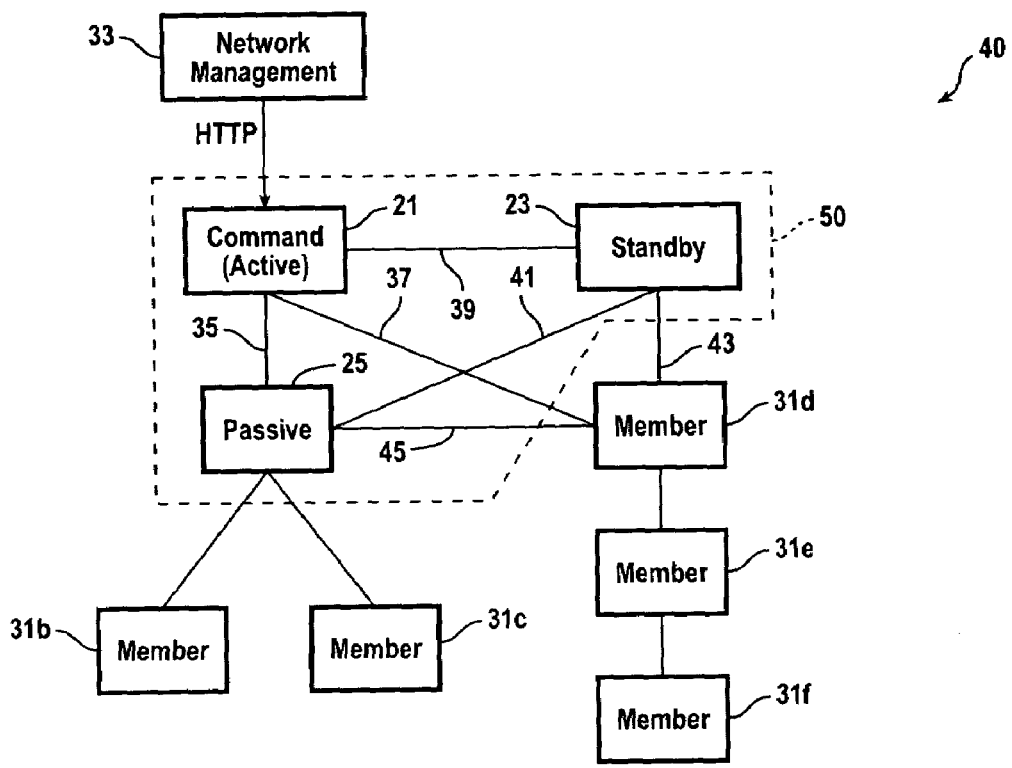
FIG. 4 is a diagram schematically illustrating a cluster of network devices according to another presently preferred embodiment of the present invention.

FIG. 4 schematically illustrates a cluster 40 of network devices according to another presently preferred embodiment of the present invention. The like elements are denoted by the like numeral references in FIG. 3. The cluster 40 includes a command network device 21 and at least one member network devices 31b-31f. A standby group 35 is defined by assigning a virtual IP address and a virtual MAC address thereto, as described above. According to this embodiment, the standby group 50 includes the command network device 21, a second network device 23, and a third network device 25. The second network device 23 and the third network device 25 are preferably members of the cluster 40, but this is not required.

Each network device in the standby group 50 has its own IP address and standby priority. In the same way as described above, the network device having the highest priority (for example, the command network device 21) becomes an active commander, the network device having the second highest priority (for example, the second network device 23) becomes a standby commander, and the network device having the third highest priority (for example, the third command network device 25) becomes a passive commander, when the standby group 50 is bound to the cluster 40.

The virtual IP address and the virtual MAC address belong to the active commander, and the cluster 20 is managed and controlled through the active commander, as described above.

When the active commander (the command network device 21) fails, the standby commander (second network device 23) takes over the role of the active commander, becoming the current active commander. The passive commander (the network device 25) then takes the role of the second network device 23, becoming the current standby commander. The passive commander also takes over the standby commander role when the standby commander fails while the active commander is working. In the case where the active commander (command network device 21) and the standby commander (the second network device 23) fail together, the passive commander (the third network device 25) takes over the active role and becomes the current active commander.

Compared with the cluster 20, it can be seen that the member network device 31a in the cluster 20 has been selected to be the third network device 25 for the standby group 50. It should be noted that a new connection 45 between the third network device 25 and the member network device 31*d* is added in order to provide additional connectivity to the cluster 40. Through the redundant connectivity, the third network device 25 can reach all of the member network devices 31*b*-31*f* even if both the commander network device 21 and the standby network device 23 fail at the same time.

Next, a method for creating and operating a high reliability management system for a cluster of network devices according to a presently preferred embodiment of the present invention is described. The cluster 40 in FIG. 4 is used as an exemplary cluster for describing the method without any intent of limitation. A cluster described below may be the cluster 20 or any other similar clusters.

Figure 5:
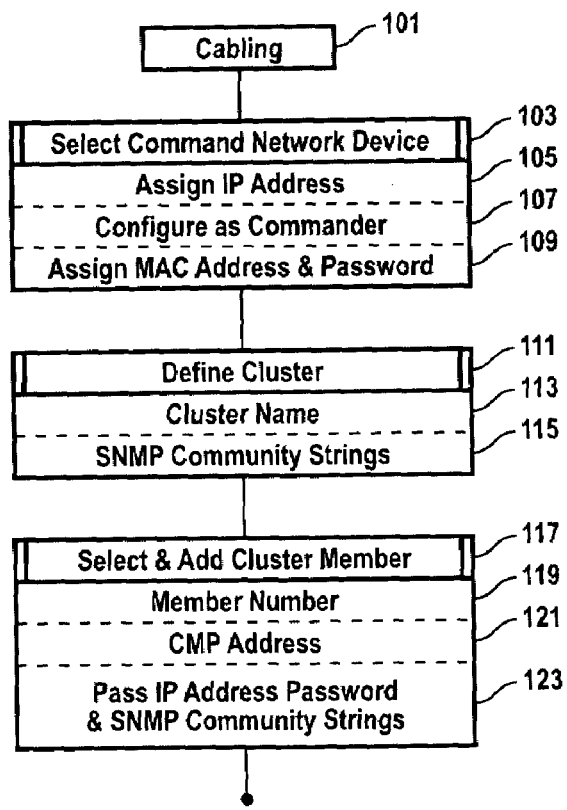
FIG. 5 is a process flow diagram schematically illustrating a procedure for creating a cluster of network devices according to a presently preferred embodiment of the present invention.

FIG. 5 schematically illustrates a process for creating a cluster of network devices. First, the network devices, which are candidate members for a cluster, are cabled together (101). The network devices are typically LAN switches or similar Layer 2 switches. Each network device must be running clustering software in order to be a cluster member. A port of each network device belongs to a management virtual network, such as a management VLAN. A cluster can be formed from network devices located in several different buildings on a company's premises or a campus, and may be linked by fiber optic, Fast Ethernet, or Gigabit Ethernet connections.

Next, a command network device is selected from the cabled network devices (103). This includes selecting a first network device (to be the command network device 21) and assigning an IP address (commander IP address) thereto (105), and configuring it as a command network device for the cluster (107). A MAC address and a password are also assigned to the command network device 21 (109).

Then, a cluster is defined (111) by assigning a cluster name (113). For example, the cluster name may be "eng-cluster." SNMP community strings are also defined (115). The commander IP address, the password assigned to the command network device 21, and the SNMP community strings are used to manage the cluster 40 through the command network device 21 in the clustering technology context.

Next, one or more candidate network devices are selected and added to the cluster as a member of the cluster 40 (117). Such member selection may include automatically discovering the member candidates among network devices belonging to the management virtual network, by using, for example, Cisco Discovery Protocol (CDP), available from Cisco Systems, Inc. of San Jose, Calif. A candidate network device has a MAC address. A candidate network device can also have an IP address, but an IP address is not required to be a member of the cluster.

When a candidate network device is added to the cluster 40 as a member (for example, the member network device 31*d*), a member number is defined and assigned to the member network device (119). A private or intra-cluster IP address (called Cluster Management Protocol (CMP) address) may also defined and assigned to the member network device (121). The command network device 21 may automatically generate and assign a CMP addresses to a member network device when the network device first joins the cluster 40. The CMP addresses may be in "10. x. y. z" format, where x, y and z are integers between 0 and 255. The CMP addresses identify the network devices within the cluster 40, and used for intra-cluster communication and cluster management. The CMP addresses are maintained internally by the commander and not seen from outside of the cluster 40.

The commander IP address, the password, and the SNMP strings are passed to the member network device (123). For example, the following SNMP community strings are added to a member network device when it joins the cluster 40:

commander-readonly-community-string@esN;
commander-readwrite-community-string@esN;

where N is the member number of the member network device. These assignments may be automatically done by the command network device 21 when the member network device is added to the cluster 40.

By repeating 117-123, a desired number of member network devices are added to the cluster 40.

Because the command network device 21 manages the forwarding of all configuration and management information to the cluster members, it is important to make the cluster management system reliable even if the command network device 21 fails for some reasons. This is realized by providing a redundant/standby network device to take over the commander role upon a failure of the command network device 21. Redundant cabling is also required for a standby network device to automatically take over when a command network device 21 fails, as discussed above. Furthermore, in order to make the takeover automatic and seamless, the cluster configuration information is shared and synchronized between the active command network device and the standby network device.

Figure 6:
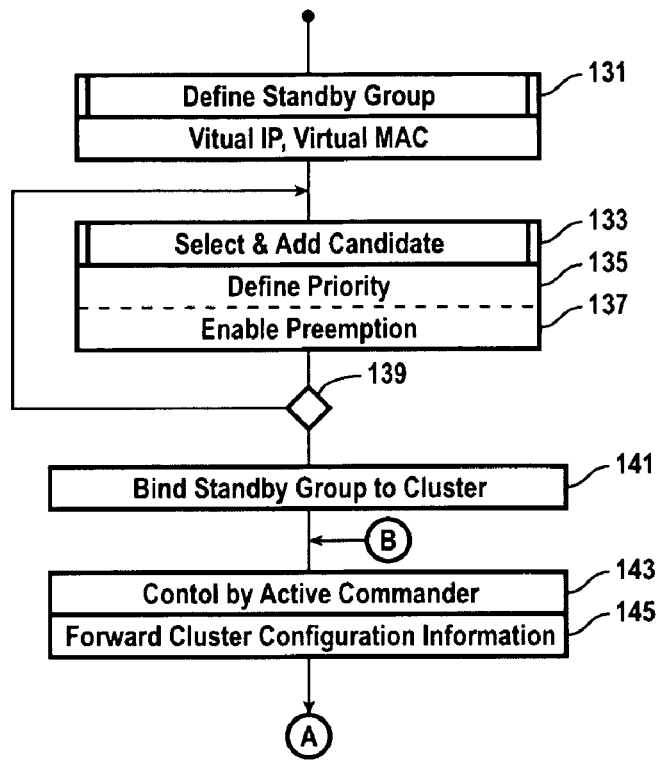
FIG. 6 is a process flow diagram schematically illustrating a procedure of creating a standby group for the cluster of network devices according to a presently preferred embodiment of the present invention.

FIG. 6 schematically illustrates a process flow of creating a standby group for a cluster of network devices, for example, the cluster 40. FIG. 4 is also referred to in the following explanation, but the present invention is not limited to a specific cluster or standby group.

First, a standby group 50 is defined by assigning a virtual IP address and a virtual MAC address thereto (131). A unique group number and a unique group name may also be assigned to the standby group 50. Typically, the virtual IP address and the group number is assigned by a network administrator, and the virtual MAC address is automatically generated and assigned by the commander network device 21 based on the group number. However, these parameters may be defined and assigned in any manner.

According to a presently preferred embodiment of the present invention, the Hot Standby Router Protocol (HSRP) is used to build the standby group for redundant cluster management. A HSRP group contains a command network device and one or more eligible group member network devices, and the HSRP group is configured with the unique virtual IP address. All of the network devices in the HSRP group will bear the unique virtual IP address, unique virtual MAC address, unique group number, and unique group name, when seen from the outside.

After the standby group is defined, a candidate network device (e.g., a second network device 23) is selected among network devices belonging to the same virtual management network as the command network device 21. A candidate network device for the standby group 50 must have its own IP address in order to communicate with each other within the standby group 50. A candidate network device must also be capable of acting as a commander of the cluster, i.e., the network device must be so configured. Any number of eligible network devices can belong to a standby group. A network device belonging to the standby group is, preferably, also a member of the cluster, but this is not required. However, the redundant connectivity to the cluster members is required, as described above.

When the selected candidate is added to the standby group 50 (133), a standby priority is defined for the network device (135). The standby priority may be defined by a number between 0 to 225. The standby priority is typically assigned by the network administrator. The network device may have the default priority, for example, 100. The priority may be determined according to redundant connectivity of the network device in the cluster 40.

In order to maintain the priority ranking, a priority number preemption may be set to each network device of the standby group 50 (137). When the priority number preemption is set, the standby priority is maintained even when the command network device fails and then becomes active. That is, when a network device with a higher priority comes back to be active, it takes over a current active commander with a lower priority. The lower priority network device returns to a standby commander.

By repeating 133-137, a desirable number of network devices are included in the standby group 50 (139). For example, the second and third member network devices 23 and 25 may be added and assigned the second and third priorities, respectively.

Then, the standby group 50 is bound to the cluster 40 (141), by replacing the commander IP address with the virtual IP address, and by replacing the MAC address of the commander network device 21 with the virtual MAC address. Upon the binding, the network device with the highest priority in the standby group 50 becomes the active commander. Similarly, the network device with the second highest priority becomes the standby commander, and the network device with the third highest priority, if any, becomes a passive commander. A network device with a priority lower than third, if any, also becomes a "passive" commander, and will take over any necessary roll in the standby group 50 according to its priority order.

If the standby priority of network devices in the standby group has not been set, or the network device has the same standby priority as another network device in the standby group (for example, the same default priority), the standby priority may be determined according to the IP address of the network devices.

Form the point of binding, the cluster 40 is controlled and managed through the command network device 21 (143), using the virtual IP address. The virtual MAC address is also used by the active commander to communicate with the member network devices 31b-31f of the cluster.

After the binding, the cluster configuration information is periodically forwarded from the active commander (the command network device 21) to the standby commander (the standby network device 23) (145). Thus, the standby commander maintains the current cluster configuration information as well as the active commander. This synchronization between the active and standby commanders allows the standby commander to immediately take over the active commander role when the active commander fails ("hot" standby), without additional procedure to recover the lost information or otherwise. The cluster configuration information may include a cluster name of the cluster, a MAC address of each member network device, and a member number of each member network device.

It is typical to create a cluster first, then create a standby group and bind it onto the cluster, as described above. However, it is possible to create a cluster and a standby group for the cluster at the same time. It is also possible to first define and create a standby group that includes a command network device, next create a cluster by adding member network devices for the commander network device, and then bind the standby group to the cluster. Those of ordinary skill in the art will understand and be able to create a cluster and a standby group in desirable order without further explanation.

Furthermore, a network device may be added to or removed from the cluster or the standby group at any time, if such a network device is eligible. Such addition or removal may require additional cabling, configuration, or change to the management VLAN to which the network devices belong.

Figure 7:
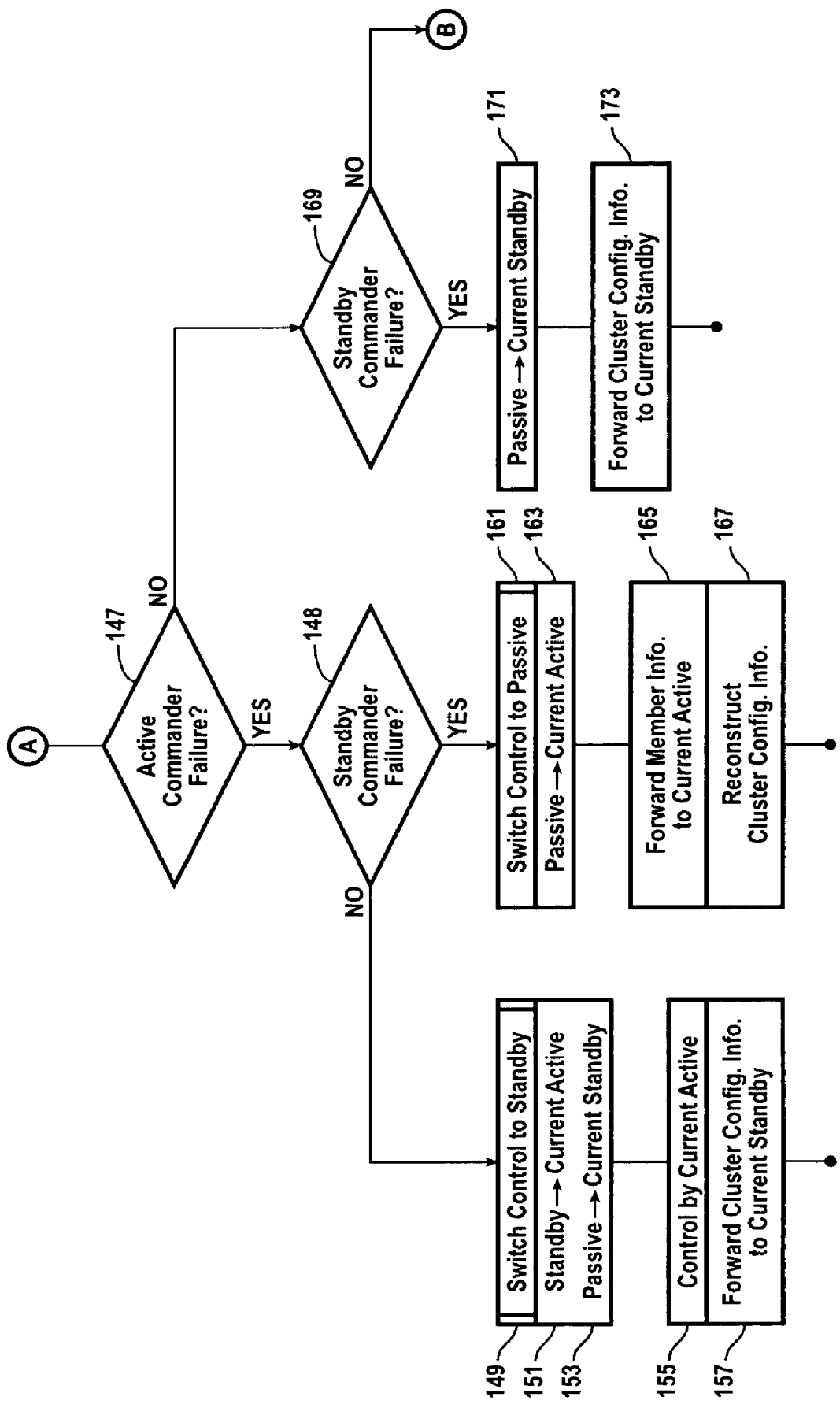
FIG. 7 is a process flow diagram schematically illustrating takeover operations within a standby group according to a presently preferred embodiment of the present invention.

FIG. 7 schematically illustrates process flow of takeover processes within a standby group. The standby group 50 in FIG. 4 is used for the following explanation, but the present invention is not limited to a specific cluster or standby group.

When a failure of the active commander is detected (147), the cluster control is switched from the active commander (command network device 21) to the standby commander (network device 23) (149), if the standby commander is normally operating (148). The use of the virtual IP address and the virtual MAC address is transferred to the standby commander, and the standby commander (network device 23) becomes a current active commander (151).

In the case where the standby group 50 includes one or more passive commanders, one having the highest priority among them (for example, network device 25) becomes a current standby commander (153) when the standby commander becomes the current active commander. In addition, when the current active commander begins controlling the cluster 40 (155), it also periodically forwards the cluster configuration information to the current standby commander (157).

If the active and standby commanders fail together (148), the control of the cluster 40 is switched from the active commander to the passive commander (161), and the passive commander becomes a current active commander (163). The use of the virtual IP address and the virtual MAC address is transferred to the passive commander. Since both the active commander and the standby commander may fail at the same time, or the standby/current active commander may fail before the failed active commander's revival, it is preferable to include at least one passive commander in the standby group 50.

When the passive commander becomes the current active commander, however, the passive/current active commander does not have the cluster configuration information, since the HSRP maintains the synchronization only between the active commander and the standby commander, in order to minimize the network traffic. Thus, upon switching the cluster control to the passive commander, each member network device in the cluster 40 forwards its own cluster member information to the passive/current active commander (165). Such cluster member information may include a MAC address and a member number of the member network device. Using the cluster member information from the member network devices, the current active commander recovers the cluster configuration information (167).

If the standby commander fails while the active commander is normally operating (169), the control of the cluster 40 remains in the active commander. However, the passive commander takes over the role of the failed standby commander and the passive commander becomes a current standby commander (171). Then, the current active commander begins periodically forwarding the cluster configuration information to the current standby commander (173), so that the cluster configuration information is synchronized between the current active and current standby commanders.

According to a presently preferred embodiment of the present invention, the network devices in the standby group ("HSRP network devices") exchange HSRP messages so as to realize an automatic and immediate takeover upon a failure of the active commander. That is, the network devices periodically advertise state information using various messages (HSRP messages). The HSRP network devices can be identified using their actual IP addresses. Each HSRP network device, including the active commander, uses its actual IP address as the source IP address of HSRP messages, not the virtual IP address.

The HSRP messages may include Hello messages, Coup messages, and Resign messages. The Hello messages are sent to indicate that a network device is running and is capable of becoming the active or standby commander. Coup messages are sent when a network device wishes to become the active commander. Resign messages are sent when a network device no longer wishes to be the active commander.

Figure 8:
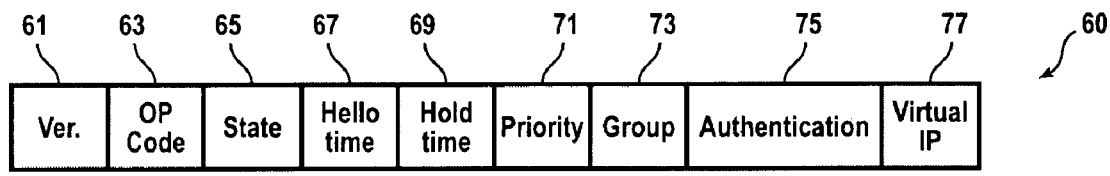
FIG. 8 is a diagram schematically illustrating an example of data format of a HSRP packet.

FIG. 8 illustrates an example of data format for a HSRP packet 60 of the HSRP messages. As shown in FIG. 8, the HSRP packet 60 has data fields including an operation code (OP code) field 63, a state field 65, a priority field 71, a group field 73, and a virtual IP address field 77.

The OP code field 63 describes the type of message contained in the packet, such as the Hello, Coup, or Resin messages, as described above. The state field 65 describes the current state of the source HSRP network device, for example, active, standby, or passive. The priority field 71 indicates the standby priority of the source HSRP network device. The priority field 71 is used to elect the active and standby network devices; the network device having a higher priority wins. If the network devices have the equal priority or the standby priority has not been set, the network device with the higher IP address wins. The group field 73 identifies the standby group (for example, it contains the group number). The virtual IP address field 77 contains the virtual IP address used by the standby group.

The HSRP packet 60 may also contain a version field 61 and an authentication data field 75. The version field 61 indicates the version of the HSRP message, and the authentication Data field 75 is used to authenticate the message.

The Hello messages are transmitted at predetermined intervals (Hellotime), for example, 3 seconds. The standby commander and other HSRP network devices can learn a failure of the active commander from the absence of the Hello messages from the active commander. This may be implemented using a timer monitoring the receipt of Hello messages. For example, each HSRP network device maintains an Active timer for counting a predetermined time (Holdtime) during which the last-seen Hello message from the active commander is valid. Such Holdtime must be greater than the Hellotime, and is preferably at least three times the value of the Hellotime. For example, the Holdtime is 10 seconds. The Active timer is reset every time when a Hello message with an active state received. If the next Hello message is not received within the Holdtime, the Active timer expires. Thus, the expiry of the Active timer indicates a failure of the active commander. This event (expiration of the Active timer) triggers the standby commander to change its state from the standby to the active, so that the standby commander takes over the active commander's role.

Each HSRP network device may maintain another timer for monitoring the standby commander (a Standby timer), as well as the Active timer, so that it can know which commander devices are alive or dead, so as to change its state and to take an appropriate action in accordance with its priority order in the standby group.

As shown in FIG. 8, the HSRP packet 60 may also contain a Hellotime field 67 and a Holdtime field 69. The Hellotime field 67 and Holdtime field 69 are only meaningful in Hello messages, and contain the Hellotime and Holdtime as described above. If (and only if) the Hellotime or Holdtime is not configured on a network device, the network device may learn the Hellotime and/or Holdtime from a Hello message sent by the active commander.

State transitions in each HSRP network device may be realized by implementing a state machine in the HSRP network device. The state machine may have "Active" state and "Standby" state, and indicate one of them. The state machine may also have "Speak" state and "Listen" or "Passive" state.

In the Active state, the HSRP network device is currently receiving cluster configuration information and management data packets that are sent to the virtual IP address, and redirecting them to the member network devices. The "active" HSRP network device (i.e., the active commander) sends periodic Hello messages using the virtual MAC address as its source MAC address. The "active" network device is also receiving and processing SNMP data packets that are sent to the virtual MAC address from the member network devices.

In Standby state, the HSRP network device is a candidate to become the next active commander and also sends periodic Hello messages using its own MAC address. The Speak state indicates that the network device is sending periodic Hello messages and actively participating in the election of the active and/or standby network device. Thus, the network device in either Active or Standby state is also in Speak state. In Listen (or Passive) state, the network device knows the virtual IP address, but it is neither the active nor standby network device. The passive network device listens for Hello messages from the active and standby network devices.

The state machine may also have Initial state and Learn state. The Initial state is the starting state and indicates that HSRP is not running. This state is entered via a configuration change or when an interface first comes up. In the Learn state the network device has not determined the virtual IP address, and not yet seen a Hello message from the active commander. In this state, the network device is still waiting to hear from the active commander.

A HSRP network device maintains or changes its state based on receipt (or non-receipt) of HSRP messages from other HSRP network devices. "Events" may be defined for either maintaining the status or triggering a state transition by a combination of receipt (or non-receipt) of HSRP messages and the priority order between the sender and recipient network devices. A specific event or a specific combination of events may maintain the current state of the HSRP network device, may cause state transition, or may trigger an action of the HSRP network device.

For example, as long as a HSRP network device in the Standby state (i.e., the standby commander) is receiving Hello messages of a higher priority from a HSRP network device in the Active state (i.e. Hello messages from the active commander), it maintains its Standby state. If the standby commander's Active timer expires (i.e., the standby commander does not receive Hello messages from the active commander for the predetermined time period), it changes its state from the Standby to the Active, taking over the active commander's role. At the same time, the standby commander may send out a Coup message to notify other HSRP network devices of the takeover. When a HSRP network device in the Listen or Passive state (i.e., the passive commander) receives the Coup message of a higher priority from the HSRP network device in the Standby state (i.e. from the standby commander) and its Active timer has expired, it changes the state from the Listen/Passive to the Speak/Standby. If a current active commander receives a Coup message of a higher priority from a HSRP network device in the Listen state, i.e., from the "original" or "former" commander now coming back, the current active commander issues a Resign message and changes its sate from the Active to Standby. The current standby commander leans the event from the Resin message and returns to Listen/Passive state. Other state changes of a HSRP network device are made in a similar manner as is well understood by those of ordinary skill in the art.

Figure 9:
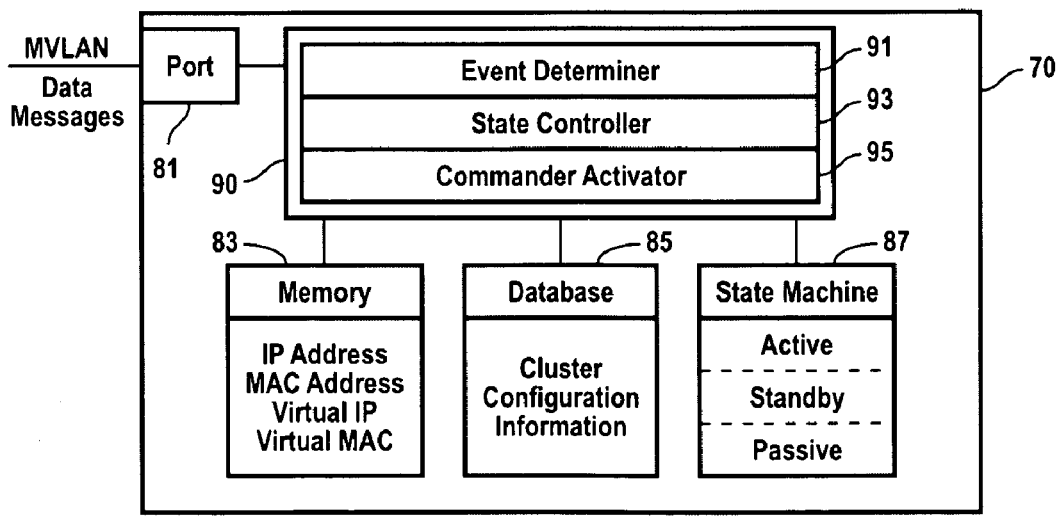
FIG. 9 is a diagram schematically illustrating an example of HSRP network device according to a presently preferred embodiment of the present invention.

FIG. 9 schematically illustrates an example of HSRP network device 70 for providing high reliability to management of a cluster of network devices according to a presently preferred embodiment of the present invention. As shown in FIG. 7, the HSRP network device 70 includes a port 81, a memory 83, a database module 85, a state machine 87. The HSRP network device 70 also includes an event determiner 91, a state controller 93, and a commander activator 95, which may be implemented in a processor 90.

The port 81 is allocated so as to belong to a management virtual network. The HSRP network device 70 communicates with member network devices of the cluster, and exchanges data packets and HSRP messages with other HSRP network devices in the standby group through the port 81. The HSRP network device 70 may have other ports but not shown in FIG. 9.

The memory 83 includes a location allocated to store an IP address and a MAC address of the HSRP network device 70, and a location allocated to store the virtual IP address and the virtual MAC address of the standby group. The virtual IP address and the virtual MAC address are defined and assigned to the standby group as described above. The memory 83 also includes a location allocated to store a standby priority assigned to the HSRP network device 70. Such a location may be a block of memory addresses or the like. When the HSRP network device 70 is operating, such address and priority information is stored in the corresponding memory location.

The state machine 87 has Active state and Standby state. The state machine 87 may also have Listen/Passive state. The state machine 87 may further indicate Speak, Initial, Learn, and/or other states. In addition, the state machine 87 may have a Forward Info state which indicates that the HSRP network device 70 is periodically forwarding the cluster configuration information to the passive commander. In this case, in combination with a timer for the forwarding interval, the forwarding operation of the cluster configuration information is also controlled using the state machine 87.

The event determiner 91 determines an event based on receipt of the Hello messages and the state and priority information contained in the received Hello messages. Such an event may be specified by a combination of receipt or non-receipt of the Hello messages and the priority status of the sender network device. A specific event or a specific combination of events occurred in a HSRP network device triggers a state transition and/or an action of the receiving HSRP network device, as described above.

The event determiner 91 may include a priority determiner (not shown in FIG. 9) that compares the priority of received Hello messages with the standby priority of the HSRP network device 70 stored in the memory 83. The event determiner 91 may also include an Active timer and a Standby timer (not shown), as described above, to monitor receipt and non-receipt of Hello messages from the active and standby commanders. In addition, the event determiner 91 may also include other times such as a Forward Info timer as described above, and a Hello timer for measuring the intervals for sending Hello messages.

The event determiner 91 determines, for example, the following events: (1) Active timer expiry; (2) Standby timer expiry; (3) Hello timer expiry; (4) Receipt of a Hello message of higher priority from the active commander; (5) Receipt o a Hello message of lower priority from the active commander; (6) Receipt of a Resign message from the active commander; (7) Receipt of a Coup message from a higher priority HSRP network device; (8) Receipt of a Hello message of higher priority from the standby commander; and (9) Receipt of a Hello message of lower priority from the standby commander. The event determiner 91 may determine any other events to facilitate the takeover within the standby group as is understood by those of ordinary skill in the art.

The state controller 93 is responsive to the events determined by the event determiner 91, and changes the state of the state machine 87 accordingly. For example, if the Active timer expires when the state machine is in the Standby state, the state controller 93 changes the state machine 87 into the Active state. If both the Active timer and the Standby timer expire when the state machine is in the Passive state, the state controller changes the state machine 87 into the active state.

The commander activator 95 is responsive to state transition of the state machine 87. When a specific state transition occurs, the commander activator 95 replaces the IP address assigned to the HSRP network device 70 with the virtual IP address of the standby group, and replaces the MAC address of the HSRP network device 70 with the virtual MAC address of the standby group. The virtual IP address and the virtual MAC address are used as the source IP address and the source MAC address of the HSRP network device 70 during the state machine 87 is in the Active state. Such a specific state transition triggers the commander activator 95 is one from the Standby state to the Active state, or one from the Listen/Passive state to the Active state. Such state transition may occur when the standby group is first bound to the cluster, or when a failure of the active commander and a takeover ("failover") takes place.

The database module 85 is capable of receiving, maintaining and transmitting the cluster configuration information described above. The database module 85 is also responsive to the status of the state machine 87 and/or events determined by the event determiner 91. When the state machine 87 indicates that the HSRP network device 70 is in the Active state, the database module 85 maintains the cluster configuration information and periodically transmits the information to the standby commander. Such periodic transmission may be realized using a Forward Info timer, as discussed above. When the state machine 87 indicates that the HSRP network device 70 is in the Standby state, the database module 85 receives, stores, and updates the cluster configuration information forwarded from the active commander.

The database module 85 may also receive cluster member information from each member network device of the cluster, and reconstruct said cluster configuration information from the received cluster member information, when the state machine 87 changes from the Passive state to the Active state.

The database module 85 may be a combination of hardware and software and integrated into the processor 90 and/or the memory 83, and may use the memory 83 to store the cluster configuration information.

In addition, the HSRP network device 70 may further include a Hello message sender (not shown in FIG. 9) for sending out hello messages in predetermined intervals. The Hello message sender may be responsive to an event such as expiry of a Hello timer. Upon every Hello timer expiry a Hello message is sent and the Hello timer is reset. The Hello message sender is also state-dependent, and sends Hello messages only when the state machine 87 is in the Active or Standby state, or in the Speak state. The message sender may be implemented in the processor 90.

The HSRP network device 70 may also include an address filter responsive to the state machine 87, so that the HSRP network device 70 receives data packets and messages destined for the virtual IP address only when it is in the Active state. The address filter also filters the data packets and messages by their destination MAC address so that the HSRP network device 70 receives data packets and messages destined for the virtual MAC address only when the state machine 87 is in the Active state.

According to a presently preferred embodiment of the present invention, the active commander transmits heartbeat messages at predetermined intervals to each member network device of said cluster, and each member network device also transmits member heartbeat messages at predetermined intervals to the active commander. By receiving the commander/member heartbeat messages, the member network devices know that the active commander is alive, and vice versa. The member heartbeat messages may include current state information and port status information of the member network device, whereby the active commander knows the status of the member network devices and updates the member and cluster information.

While embodiments and applications of this invention have been shown and described, it would be apparent to those skilled in the art having the benefit of this disclosure that many more modifications than mentioned above are possible without departing from the inventive concepts herein. The invention, therefore, is not to be restricted except in the spirit of the appended claims.

What is claimed is:

1. A method for managing a cluster of network devices, the network devices belonging to a management virtual network, the cluster including a command network device and at least one member network device, the command network device having a commander internet protocol (IP) address and a commander media access control (MAC) address, the cluster configured to be managed through the command network device using the commander IP address, the command network device communicating with the member network device using the commander MAC address, the method comprising:

defining a standby group by assigning a virtual IP address and a virtual MAC address to the standby group;

selecting a first network device for the standby group, the first network device being the command network device;

selecting a second network device for the standby group, the second network device having an IP address and belonging to the management virtual network;

defining a standby priority for each network device in the standby group;

binding the standby group to the cluster by replacing the commander IP address with the virtual IP address and the commander MAC address with the virtual MAC address, and configuring the network device with a highest standby priority in the standby group to be an active commander and the network device with a second highest standby priority in the standby group to be a standby commander, the active commander being configured to receive command instructions for implementing command of the at least one network device of the cluster, the command instructions being directed to the virtual IP address of the active commander in lieu of an individual addresses of the at least one network device of the cluster, and the active commander being configured to control the at least one network device by generating and assigning a Cluster Management Protocol (CMP) address to each at least one member network device when each at least one member network device first joins the cluster, each CMP address identifying a corresponding at least one network device within the cluster for intra-cluster communication;

sharing of cluster configuration information from the active commander to the standby commander on a periodic basis to synchronize the active commander with the standby commander;

configuring the network device with a third highest standby priority in the standby group to be a passive commander; and in response to the active commander and the standby commander failing together and the network device with the third highest priority switching from the passive commander to become the active commander, configuring the active commander to receive cluster member information from each of the at least one member network device, the cluster member information including a member MAC address and a member number.

2. A management network device configured to participate in managing a plurality of network devices, the plurality of network devices belonging to a management virtual network and including the management network device, a commander internet protocol (IP) address and commander media access control (MAC) address together defining a commander network device for the plurality of network devices, the plurality of network devices configured to be managed by the commander network device, the management network device comprising:

a configurable internet protocol (IP) address;

a configurable media access control (MAC) address;

a configurable standby priority;

a configurable virtual IP address and a configurable virtual MAC address together defining a standby group with which the management network device is associated;

the network management device configured to become an active commander of the plurality of network devices in response to having the highest standby priority of the plurality of network devices that are operating, the active commander being configured to control the plurality of network devices by generating and assigning a Cluster Management Protocol (CMP) address to each of the plurality of network devices when each of the plurality of network devices first joins a cluster of the plurality of network devices, each CMP address identifying a corresponding one of the plurality of network devices within the cluster for intra-cluster communication, and become an standby commander of the plurality of network devices in response to having the second highest standby priority of the plurality of network devices that are operating, in response to becoming the active commander, reconfiguring its configurable IP address with the virtual IP address of the standby group and its configurable MAC address with the virtual MAC address for the standby group, and receiving command instructions for implementing command of the plurality of network devices of the management virtual network, the command instructions being directed to the virtual IP address of the standby group in lieu of individual addresses of the plurality of network devices of the management virtual network, when operating as the active commander, share cluster configuration information with the standby commander on a periodic basis to synchronize with the standby commander, become the passive commander of the plurality of network devices in response to having the third highest standby priority of the plurality of network devices that are operating, and in response to the active commander and the standby commander failing together and one of the plurality of network devices with the third highest standby priority switching from the passive commander to become the active commander, receive cluster member information from each of the plurality of network devices to create cluster configuration information, the cluster member information including a member MAC address and a member number.

3. The device of claim 2, wherein the standby priority is defined by the configurable standby priority and another value.

4. The device of claim 2, wherein the network management device, when configured as an active commander is further configured to periodically forward information to a standby commander of the standby group.

5. A management network device configured to participate in managing a plurality of network devices, the plurality of network devices belonging to a management virtual network and including the management network device, a commander internet protocol (IP) address and commander media access control (MAC) address together defining a commander network device for the plurality of network devices, the plurality of network devices configured to be managed by the commander network device, the management network device comprising:

means for configuring an internet protocol (IP) address for the management network device;

means for configuring a media access control (MAC) address for the management network device;

means for configuring a standby priority for the management network device;

means for configuring a virtual IP address and a virtual MAC address for the management network device, the virtual IP address and the virtual MAC address together defining a standby group with which the management network device is associated;

means for configuring the network management device to become the active commander of the plurality of network devices in response to having the highest standby priority of the plurality of network devices in the standby group that are operating, and in response thereto reconfiguring its IP address with the virtual IP address of the standby group and its MAC address with the virtual MAC address for the standby group, wherein, as active commander, the network management device is configured to receive command instructions for implementing command of the plurality of network devices of the management virtual network, the command instructions being directed to the virtual IP address of the standby group in lieu of individual addresses of the plurality of network devices of the management virtual network; and means for configuring the network management device to become the standby commander of the plurality of network devices in response to having the second highest standby priority of the plurality of network devices in the standby group that are operating;

means for taking control of the network devices and becoming active commander, when initially configured as standby controller, in response to a failure of an active controller in the standby group;

wherein the means for taking control of the network devices includes means for generating and assigning a Cluster Management Protocol (CMP) address to each of the plurality of network devices when each of the plurality of network devices first joins a cluster of the plurality of network devices, the CMP addresses identifying a corresponding one of the plurality of network devices within the cluster for intra-cluster communication;

when operating as the active commander, means for sharing cluster configuration information with the standby commander on a periodic basis to synchronize with the standby commander;

means for configuring the network management device to become the passive commander of the plurality of network devices in response to having the third highest standby priority of the plurality of network devices in the standby group that are operating; and in response to the active commander and the standby commander failing together and one of the plurality of network devices with the third highest standby priority switching from the passive commander to become the active commander, means for receiving cluster member information from each of the plurality of network devices to create cluster configuration information, the cluster member information including a member MAC address and a member number.

6. The method of claim 5, wherein the standby priority is defined by the configured standby priority and another value.

7. The method of claim 5, further comprising:

forwarding periodically, when configured as an active commander, information from the network management device to a standby commander of the standby group.

8. The method of claim 5, further comprising:

controlling the plurality of network devices as active commander using the virtual IP address.

9. A management network device configured to participate in managing a plurality of network devices, the plurality of network devices belonging to a management virtual network and including the management network device, a commander internet protocol (IP) address and commander media access control (MAC) address together defining a commander network device for the plurality of network devices, the plurality of network devices configured to be managed by the commander network device, the management network device comprising:

means for storing an internet protocol (IP) address for the management network device;

means for storing a media access control (MAC) address for the management network device;

means for storing a standby priority for the management network device;

means for storing a virtual IP address and a virtual MAC address for the management network device, the virtual IP address and the virtual MAC address together defining a standby group with which the management network device is associated;

means for configuring the network management device to become the active commander of the plurality of network devices in response to having the highest standby priority of the plurality of network devices in the standby group that are operating, and in response thereto reconfiguring its IP address with the virtual IP address of the standby group and its MAC address with the virtual MAC address for the standby group, wherein, as active commander, the network management device is configured to receive command instructions for implementing command of the plurality of network devices of the management virtual network, the command instructions being directed to the virtual IP address of the standby group in lieu of individual addresses of the plurality of network devices of the management virtual network; and means for configuring the network management device to become the standby commander of the plurality of network devices in response to having the second highest standby priority of the plurality of network devices in the standby group that are operating;

means for taking control of the network devices and becoming active commander, when initially configured as standby controller, in response to a failure of an active controller in the standby group;

wherein the means for taking control of the network devices includes means for generating and assigning a Cluster Management Protocol (CMP) address to each of the plurality of network devices when each of the plurality of network devices first joins a cluster of the plurality of network devices, the CMP addresses identifying a corresponding one of the plurality of network devices within the cluster for intra-cluster communication;

when operating as the active commander, means for sharing cluster configuration information with the standby commander on a periodic basis to synchronize with the standby commander;

means for configuring the network management device to become the passive commander of the plurality of network devices in response to having the third highest standby priority of the plurality of network devices in the standby group that are operating; and in response to the active commander and the standby commander failing together and one of the plurality of network devices with the third highest standby priority switching from the passive commander to become the active commander, means for receiving cluster member information from each of the plurality of network devices to create cluster configuration information, the cluster member information including a member MAC address and a member number.

10. The device of claim 9, wherein the standby priority is defined by the configured standby priority and another value.

11. The device of claim 9, further comprising:

means for forwarding periodically, when configured as an active commander, information from the network management device to a standby commander of the standby group.

12. The device of claim 9, further comprising:

means for controlling the plurality of network devices as active commander using the virtual IP address.

* * * * *

UNITED STATES PATENT AND TRADEMARK OFFICE
CERTIFICATE OF CORRECTION

PATENT NO. : 7,656,788 B2 Page 1 of 1
APPLICATION NO. : 11/058688
DATED : February 2, 2010
INVENTOR(S) : Ma et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 672 days.

Signed and Sealed this

Twenty-eighth Day of December, 2010

David J. Kappos
*Director of the United States Patent and Trademark Office*